(12) United States Patent
Nishimura et al.

(10) Patent No.: US 12,503,538 B2
(45) Date of Patent: Dec. 23, 2025

(54) MOLDING MATERIAL COMPRISING A GROUP OF SAPONIFIED ETHYLENE-VINYL ESTER-BASED COPOLYMER PELLETS AND MOLDING METHOD USING SAME

(71) Applicant: THE NIPPON SYNTHETIC CHEMICAL INDUSTRY CO., LTD., Osaka (JP)

(72) Inventors: Daichi Nishimura, Osaka (JP); Makoto Hatanaka, Osaka (JP); Shintaro Usui, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 582 days.

(21) Appl. No.: 16/294,397

(22) Filed: Mar. 6, 2019

(65) Prior Publication Data

US 2019/0202952 A1    Jul. 4, 2019

Related U.S. Application Data

(63) Continuation of application No. PCT/JP2017/030788, filed on Aug. 28, 2017.

(30) Foreign Application Priority Data

Sep. 7, 2016  (JP) ................. 2016-174873

(51) Int. Cl.
*C08F 216/06* (2006.01)
*B29B 9/06* (2006.01)
(Continued)

(52) U.S. Cl.
CPC .............. *C08F 216/06* (2013.01); *B29B 9/12* (2013.01); *B29B 9/16* (2013.01); *B29C 48/022* (2019.02);
(Continued)

(58) Field of Classification Search
None
See application file for complete search history.

(56) References Cited

U.S. PATENT DOCUMENTS

2003/0216538 A1* 11/2003 Kawano ............... G11B 7/2534
528/106
2004/0082690 A1    4/2004 Kawahara et al.
(Continued)

FOREIGN PATENT DOCUMENTS

EP          1179546       2/2002
JP      2000-264972 A     9/2000
(Continued)

OTHER PUBLICATIONS

Communication pursuant to Article 94(3), EPO, Application No. 17 848 602.3, issued on Jul. 1, 2020.
(Continued)

*Primary Examiner* — Jeffrey D Washville
(74) *Attorney, Agent, or Firm* — GREENBLUM & BERNSTEIN, P.L.C.

(57) ABSTRACT

A molding material comprising a pellet group of at least 20 saponified ethylene-vinyl ester-based copolymer pellets, wherein at least 95% of the pellets have a surface that is substantially a single closed surface, and when a maximum outer diameter of a pellet is taken as a long diameter and a minimum diameter in a cross section having the greatest area among the cross sections perpendicular to the long diameter is taken as a short diameter, the average value of the long diameter/short diameter ratio of at least 20 pellets taken from the pellet group is 1.6 or less and the standard deviation of the long diameter/short diameter ratio of the at least 20 pellets is 0.13 or less.

1 Claim, 2 Drawing Sheets (51) Int. Cl.
- *B29B 9/12* (2006.01)
- *B29B 9/16* (2006.01)
- *B29C 48/00* (2019.01)
- *B29C 48/08* (2019.01)
- *B29C 48/14* (2019.01)
- *B29C 48/285* (2019.01)
- *B29K 31/00* (2006.01)
- *B29K 105/00* (2006.01)
- *C08J 3/12* (2006.01)

(52) U.S. Cl.
CPC ............ *B29C 48/08* (2019.02); *B29C 48/144* (2019.02); *B29C 48/288* (2019.02); *C08J 3/12* (2013.01); *B29B 9/06* (2013.01); *B29B 9/065* (2013.01); *B29K 2031/00* (2013.01); *B29K 2105/251* (2013.01); *C08F 2500/24* (2013.01); *C08F 2800/10* (2013.01)

(56) References Cited

U.S. PATENT DOCUMENTS

| | | |
|---|---|---|
| 2007/0080476 A1 | 4/2007 | Tsai et al. |
| 2009/0321300 A1 | 12/2009 | Komiya et al. |
| 2014/0018462 A1 | 1/2014 | Tsuboi et al. |
| 2016/0303768 A1 | 10/2016 | Usui |
| 2016/0375622 A1 | 12/2016 | Usui |
| 2017/0198066 A1 | 7/2017 | Matsui |
| 2017/0253721 A1* | 9/2017 | Yoshida ................. C08K 3/346 |
| 2018/0371179 A1* | 12/2018 | Kani ........................ B29B 9/12 |

FOREIGN PATENT DOCUMENTS

| | | | |
|---|---|---|---|
| JP | 2001-96530 A | | 4/2001 |
| JP | 2006524144 A | * | 10/2006 |
| JP | 4480826 | | 3/2010 |
| JP | 2015-143349 A | | 8/2015 |
| WO | 2012/133252 A1 | | 10/2012 |
| WO | 2015107957 | | 7/2015 |
| WO | 2016017478 | | 2/2016 |

OTHER PUBLICATIONS

1st Office Action issued in CN Patent Application No. 201780055075.1 on Feb. 28, 2021, English translation.

Extended European Search Report, European Patent Office, Application No. 17848602.3, issued Aug. 12, 2019.

International Search Report in International Patent Application No. PCT/JP2017/030788, dated Nov. 21, 2017.

Written Opinion of International Searching Authority in International Patent Application No. PCT/JP2017/030788, dated Nov. 21, 2017.

* cited by examiner

MOLDING MATERIAL COMPRISING A GROUP OF SAPONIFIED ETHYLENE-VINYL ESTER-BASED COPOLYMER PELLETS AND MOLDING METHOD USING SAME

RELATED APPLICATION

This application is a continuation of International Application No. PCT/JP2017/030788, filed on Aug. 28, 2017, which claims priority to Japanese Patent Application No. 2016-174873, filed on Sep. 7, 2016, the entire contents of each of which being hereby incorporated by reference.

TECHNICAL FIELD

The present invention relates to a molding material comprising a pellet group of saponified ethylene-vinyl ester-based copolymer (hereinafter referred to as "EVOH resin") pellets, and to a molding method using the same; more specifically, the present invention relates to a molding material comprising a pellet group of EVOH resin pellets, the molding material having excellent feed characteristics in melt extrusion molding, and to a molding method using the same.

BACKGROUND ART

EVOH resins are thermoplastic resins which, due to hydrogen bonding between hydroxyl groups present on the polymer side chains, are highly crystalline and further have high intermolecular forces in the amorphous parts. Based on this structure, films employing EVOH resins demonstrate excellent gas barrier properties, and are used for various type of applications by way of melt molding.

EVOH resin that are used as molding materials are generally distributed as columnar or granular pellets having lengths of approximately 1 to 10 mm. EVOH resin pellets are generally produced by the strand cutting method. The strand cutting method is a method for manufacturing EVOH resin pellets, in which a solution resulting from dissolving EVOH resin (or a composition thereof) in a suitable solvent is extruded into a solidifying liquid, from a metal plate in which holes with diameters of approximately 1 to 5 mm have been formed, or a heated and melted resin is extruded through dies, cooled and hardened, to produce rod-like strands, which are cut to a predetermined size using a cutter.

In melt extrusion molding that uses such EVOH resin pellets, there is a problem known as poor feed characteristics. Specifically, noise is produced due to the screw vibration in the screw path, which constitutes the melt plasticizing section, particularly when molten resin flows in the melt plasticizing section, or due to variations in the torque or the like when extruding the resin. This situation in which noise is produced is a situation in which the screw is under load and thus, in severe cases, this may result in the screw being abraded and abraded particles contaminating the molten resin. Contamination of the molten resin by abraded particles results in degraded quality in molded articles such as films.

Techniques in which pellets are manufactured by way of hot cutting methods have been proposed, in order to solve the aforementioned problems (for example, see PTL 1 and PTL 2). In PTL 1, hydrous molten EVOH that has been discharged from a discharge port 31 of a twin-screw extruder is extruded from a die 32, and immediately thereafter, cut by the rotation of a rotary blade 33. A coolant 37 is supplied into a cutter box 35 from a coolant supply port 36, forming a water film 38 that cools the pellet immediately after the cutting, and the coolant and the pellet 40 are discharged from a pellet discharge port 39 (see paragraph [0016] and FIG. 2).

Furthermore, in PTL 2, an EVOH solution is sent from a supply pipe (1) to a filtration device (2), using fluid conveying equipment (14), and then enters a die (3) of an extrusion molder; the EVOH solution that has passed through the die (3) immediately enters a cutting section (5) and is cut by a cutter knife (4) to form EVOH solution pellets (see paragraph [0017] and FIG. 1).

Thus, in the hot cutting method, because the resin is cut in a molten state, after being cut, the resin runs at the edges formed by cutting, until it has cooled and hardened, and rounded pellets without corners are produced as a result of the surface tension of the resin. With such cornerless pellets, the flow characteristics in the screw path constituting the melt plasticizing section are improved, and thus the abnormal noise generation is reduced, as compared with the abnormal noise that occurs when pellets obtained by the strand cutting method are used.

A molding material resulting from mixing two types of EVOH resin pellets having different ethylene contents has been proposed as another technique for solving the problem described above (for example, see PTL 3). The molding material described in PTL 3 is a molding material comprising a group of EVOH resin pellets, wherein each pellet constituting the EVOH resin pellet group is a pellet having an approximately circular or elliptical cross section, and the pellet group is a pellet mixture including a first EVOH resin pellet having an ethylene unit content of 20 to 34 mol % and a second EVOH resin pellet having an ethylene unit content of 35 to 60 mol %, the difference in the ethylene unit content in the first EVOH resin pellet and the second EVOH resin pellet being 10 to 30 mol % (see paragraph [0024]).

By using a molding material obtained by mixing two such types of EVOH resin pellets, the flow characteristics in the screw path constituting the melt plasticizing section are improved (see paragraph [0079]), and thus the abnormal noise generation is reduced, as compared with the abnormal noise that occurs when pellets obtained by the strand cutting method are used.

CITATION LIST

Patent Literature

[PTL 1] Japanese Unexamined Patent Application Publication No. 2001-96530 A
[PTL 2] Japanese Unexamined Patent Application Publication (Translation of PCT Application) No. 2006-524144
[PTL 3] Japanese Unexamined Patent Application Publication No. 2015-143349 A

SUMMARY OF INVENTION

Technical Problem

When the pellets obtained by the hot cutting method proposed in PTL 1 and PTL 2 are used, while the abnormal noise generation is reduced as compared with cases in which pellets obtained with the strand method are used, abnormal noise is nonetheless generated, and thus there is a demand for further improvement.

Furthermore, the molding material proposed in PTL 3 cannot be used in cases in which one wishes to obtain an EVOH molding material with a single ethylene content, and thus there is room for improvement.

The present invention was made in view of the problems described above, and an object thereof is to provide a molding material comprising a group of EVOH resin pellets with excellent feed characteristics in melt extrusion molding, and a molding method using the same.

Solution to Problem

If an EVOH resin is melt-extruded and cut with a cutter before cooling and hardening, the edge portion produced by cutting runs while cooling and hardening and the surface tension acts so as to produce a sphere, resulting in a pellet wherein the surface consists of a seamless surface, that is, a substantially single closed surface. Specifically, depending on the shape at the time of melt extrusion (usually a quadrangular prism or cylinder), a pellet can be obtained having a shape such as a sphere, including an ellipsoid having an oval cross section, a disk shape, a rugby-ball shape, and a chestnut shape, and occasionally, a teardrop shaped or true spherical pellet can be obtained.

The present inventors arrived at the present invention by studying the shapes of pellets that serve to improve feed characteristics in melt extrusion molding, noticing that if substantially uniform pellets having shapes closer to true spheres and having less variation in shape are used, the feed characteristics are improved, and specifying a specific shape for the pellets.

That is to say, the present invention is a molding material comprising a pellet group of at least 20 substantially uniform saponified ethylene-vinyl ester-based copolymer pellets. By "substantially uniform," a vast majority of the pellets constituting the group of saponified ethylene-vinyl ester-based copolymer pellets have a surface that is substantially a single closed surface; and when a maximum outer diameter of a pellet is taken as a long diameter and a minimum diameter in a cross section having the greatest area among the cross sections perpendicular to the long diameter is taken as a short diameter, the average value of the long diameter/short diameter ratio of the vast majority of pellets taken from the pellet group is 1.6 or less and the standard deviation of the long diameter/short diameter ratio of the vast majority of pellets is 0.13 or less. In some embodiments, "vast majority" means at least 95% of the pellet group.

Furthermore, in the present invention, it is preferable that the vast majority of the pellets have an oval cross section perpendicular to the long diameter.

Further, it is preferable that a water content of the pellets is 0.5 wt. % or less.

Furthermore, in the present invention, it is preferable that the average value of the long diameter of the vast majority of the pellets is 1 to 20 mm and the average value of the short diameter of the vast majority of the pellets is 1 to 10 mm.

Furthermore, the present invention also provides a molding method using the molding material described above. Specifically, the present invention is a molding method wherein the molding material described above is supplied to an extruder in which the rotational speed of a screw is 10 to 100 rpm so as to mold a molded article.

The molding material of the present invention is a molding material comprising of a group of EVOH resin pellets having shapes closer to true spheres and having less variation in shape, and thus the feed characteristics in melt extrusion molding can be improved.

Note that, with pellets having no corners, in order to obtain a group of EVOH pellets having shapes closer to true spheres and having less variation in shape, it is necessary to deliberately use a method in which the production efficiency is poor, and those skilled in the art usually avoid such manufacturing methods, and thus molding materials such as that in the present invention have not heretofore been used.

Advantageous Effects of Invention

The molding material of the present invention is a molding material comprising of a group of substantially uniform EVOH resin pellets with a shape closer to true spheres and with less variation in shape and thus, with the present invention, the feed characteristics in melt extrusion molding are improved. Furthermore, contamination of the molten resin with abraded particles can be prevented, and thus the quality of molded articles such as films is improved.

BRIEF DESCRIPTION OF DRAWINGS

FIG. 2 (a) is a top view of exemplary EVOH resin pellets, and FIG. 2 (b) is a top view of 20 EVOH resin pellets whose the long diameter and the short diameter are measured.

FIG. 3 (a) is a top view of comparative example EVOH resin pellets, and FIG. 3 (b) is a top view of 20 EVOH resin pellets whose the long diameter and the short diameter are measured.

DESCRIPTION OF EMBODIMENTS

The present invention is a molding material comprising a group of pellets having at least 20 saponified ethylene-vinyl ester-based copolymer pellets, wherein a vast majority of the pellets that constitute the saponified ethylene-vinyl ester-based copolymer pellet group are pellets that are seamless, that is, pellets whose surface consists of a single closed surface, and pellets that are substantially uniform, that is, when a maximum outer diameter of a pellet is taken as a long diameter and a minimum diameter in a cross section having the greatest area among cross sections perpendicular to the long diameter is taken as a short diameter, the average value of the long diameter/short diameter ratio of a vast majority of pellets taken from the pellet group is 1.6 or less and the standard deviation of the long diameter/short diameter ratio of the vast majority of the pellets is 0.13 or less. In a preferred embodiment, the vast majority is at least 95% of the pellets constituting the pellet group. Such a group is considered substantially uniform.

Pellets Whose Surface Consists of Single Closed Surface

A vast majority of pellets taken from the group of EVOH resin pellets constituting the molding material of the present invention have a surface that is substantially a single closed surface. A "pellet whose surface consists of a single closed surface" is, in other words, 1) a pellet wherein the entire surface consists of a curved surface; 2) a pellet having no corners formed by the intersection of multiple faces; and 3) a pellet wherein the cross section at any position on the pellet is not rectangular. Here, a "closed surface" means a surface which is continuously curved, formed by the movement of a curve, and which is closed in the manner of a spherical surface.

Furthermore, the pellets are preferably pellets having an oval cross section perpendicular to the long diameter, as described hereafter. Here, "oval" includes an egg shapes, ellipses, oblong circles, and curved shapes similar to these shapes.

Such pellets are irregularly shaped, having a slight differences in their shapes, but usually have a shape such as a sphere including an ellipsoid, a disk shape, a rugby-ball shape, and a chestnut shape, and occasionally, pellets having teardrop shapes, or true spherical shapes may also be present.

Long Diameter and Short Diameter of Pellets

The average value of the long diameter/short diameter ratio of the vast majority of pellets taken from the pellet group of EVOH resin pellets constituting the molding material of the present invention is 1.6 or less and the standard deviation of the long diameter/short diameter ratio among the vast majority of the pellets is 0.13 or less. In a preferred embodiment, the vast majority is at least 95% of the pellets constituting the pellet group. Such a group is considered substantially uniform.

Here, the long diameter of the pellet is the maximum diameter when the pellet is three-dimensionally observed. Furthermore, the short diameter of the pellet is the minimum diameter in a cross section having the greatest area among cross sections perpendicular to the long diameter. For example, when the cross section is circular, this is the length of the diameter thereof, and when it is elliptical, this is the length of the minor axis thereof.

Figure 1:
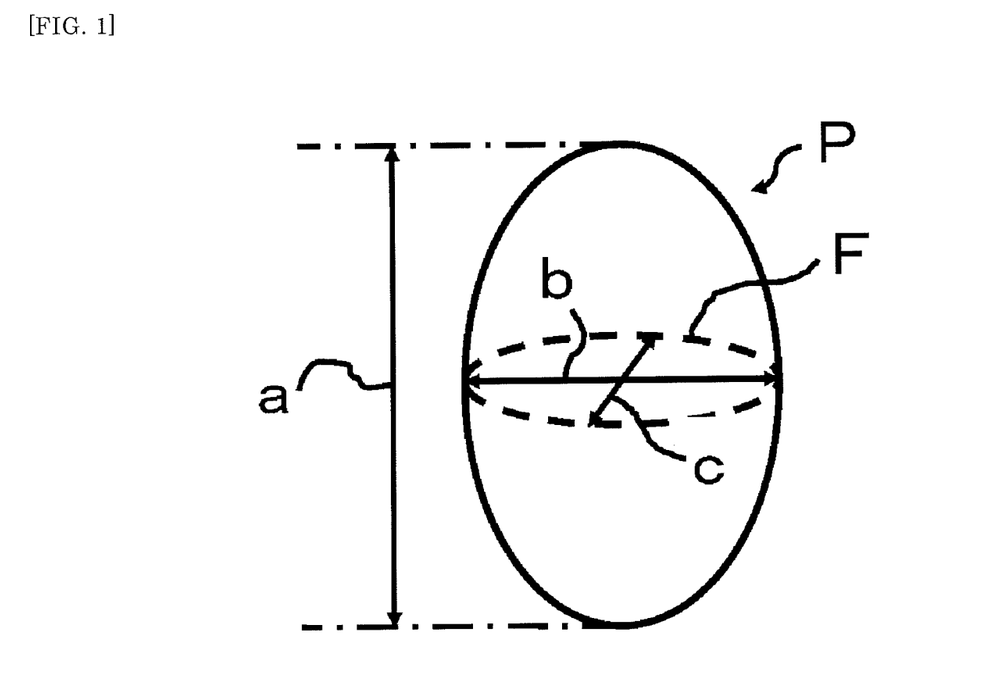
FIG. 1 is a schematic view serving to explain the long diameter and the short diameter of a pellet P, which is an ellipsoid.

Here, specific description will be given with reference to FIG. 1. To facilitate understanding, FIG. 1 shows a case in which the pellet P is an ellipsoid. The maximum outer diameter when the pellet P is three-dimensionally observed is "a", and therefore the long diameter is "a". Next, the cross section having the greatest area among the cross sections perpendicular to the long diameter is the cross section F located at a midpoint on the long diameter. The cross section F is elliptical, the length of the major axis is "b", and the length of the minor axis is "c", and thus the minimum diameter of the cross section F is "c", and therefore, the short diameter is "c".

Based on the foregoing, in the case of the pellet P shown in FIG. 1, the long diameter is "a" and the short diameter is "c", and therefore the long diameter/short diameter ratio is "a/c".

Note that, in this embodiment, the average value of at least 20 pellets is used for both the long diameter and the short diameter. The at least 20 pellets are taken from the pellet group in a random manner.

Method For Measuring Long Diameter and Short Diameter

The average value of the long diameter/short diameter ratio of the at least 20 pellets taken from the group of pellets constituting the molding material of the present invention is 1.6 or less, preferably 1.1 to 1.5, and particularly preferably 1.2 to 1.4. If this value is too great, the feed characteristics and the discharge stability tend to be poor when used in melt extrusion molding, but if this value is within the aforementioned range, the effect of the present invention tends to be more efficiently achieved.

Furthermore, with the at least 20 pellets taken from the group of pellets constituting the molding material of the present invention: preferably, the average long diameter value is 1 to 20 mm and the average short diameter value is 1 to 10 mm; particularly preferably the average long diameter value is 3 to 6 mm, and the average short diameter value is 2 to 6 mm; and more preferably, the average long diameter value is 3.5 to 5.5 mm, and the average short diameter value is 5 to 5.5 mm. When the values are within the aforementioned ranges, the effects of the present invention tend to be achieved more efficiently.

Note that, a method for measuring the long diameter and the short diameter includes, for example, a method in which the pellet is picked up by hand and observed, and the long diameter is measured using a measuring instrument such as calipers, whereafter the position of the cross section having the greatest area among the cross sections perpendicular to this long diameter is determined by visual and tactile means, and the short diameter is measured in the same way, with this cross section assumed.

Method for Calculating Standard Deviation of Long Diameter/Short Diameter Ratio

In the present embodiment, the long diameter/short diameter ratio is found by measuring the long diameters and short diameters of 20 pellets taken from the pellet group constituting the molding material of the present invention in a random manner, and the standard deviation is found for the 20 pellets.

Where $X_i$ (i=1 to 20) is the long diameter/short diameter ratio of the 20 pellets and $X_{ave}$ is the average value for the long diameter/short diameter ratio, the standard deviation S is found by the following formula (1).

$$\text{Standard deviation } S = \sqrt{[\{(X_1 - X_{ave})^2 + (X_2 - X_{ave})^2 + \ldots + (X_i - X_{ave})^2 + \ldots + (X_{19} - X_{ave})^2 + (X_{20} - X_{ave})^2\}/20]} \quad (1)$$

The standard deviation of the long diameter/short diameter ratio for the 20 pellets taken from the pellet group constituting the molding material of the present invention in a random manner is 0.13 or less, preferably 0.05 to 0.13, and particularly preferably 0.10 to 0.12. If this value is too great, feed characteristics and discharge stability tend to be inferior when used in melt extrusion molding, but if this value is within the aforementioned range, the effect of the present invention tends to be more efficiently achieved.

The pellets constituting the molding material of the present invention usually have a per-pellet weight of 10 to 40 mg, preferably 15 to 35 mg, and particularly preferably 15 to 30 mg. The pellets are stored in vessels such as bags, tanks, and containers, and are used in molding processes. Specifically, a package containing 25 kg of the molding material of the present invention normally contains approximately 630,000 to approximately 2,500,000 pellets. In the present invention, 20 pellets are arbitrarily, that is, in a random manner, taken from the pellet group constituting the molding material, and used for the aforementioned measurements.

The surface of a vast majority of pellets taken from the pellet group constituting the molding material of the present invention have a surface that is substantially a single closed surface, in other words, the entire pellet consists of a curved surface, and has shape closer to a true sphere than conventional pellets, with less variation in shape. Thus, this means that, when a pellet group comprising an unspecified large number of pellets constituting the molding material of the present invention is measured using 20 pellets, which is a very small number of pellets, as a sample, pellets at arbitrary locations in a pellet group satisfy the average value and the standard deviation stipulated by the present invention. In other words, this means that there is little variation in the shapes of the overall pellets included in the pellet group in the molding material of the present invention.

Method for Measuring Water Content

The pellet group constituting the molding material of the present invention preferably has a water content of 0.5 wt. % or less, particularly preferably 0 to 0.3 wt. %, and more preferably 0 to 0.25 wt. %.

The water content of pellets is measured by the following method.

First, 10 g of pellets are placed in an aluminum cup, the aluminum cup alone (weight: C1) and the weight (C1+P1) of the aluminum cup containing the pellets (weight: P1) are each measured. Then, the aluminum cup containing the pellets is heat treated for 5 hours at 150° C., using a commercially available dryer ("SAFETY OVEN SPH-100)" made by Tabai Espec Corp.), without performing nitrogen purging and vacuum suctioning. After heat treatment, the aluminum cup containing pellets is removed from the dryer, left for 30 minutes in a desiccator containing a desiccant, the temperature of the pellets is returned to room temperature, the weight (C1+P2) of the aluminum cup containing the pellets (weight: P2) after heat treatment is measured, and the water content (wt. %) is calculated by way of the following formula (2).

$$\text{Water content} \tag{2}$$
$$(\text{wt. \%}) = [\{(C1 + P1) - (C1 + P2)\}/\{(C1 + P1) - C1\}] \times 100 =$$
$$\{(P1 - P2)/P1\} \times 100$$

Saponified Ethylene-Vinyl Ester-Based Copolymer (EVOH Resin) Pellets
(1) EVOH Resin The saponified ethylene-vinyl ester-based copolymer (EVOH resin) used as the molding material of the present invention is a saponified ethylene-vinyl ester-based copolymer obtained by copolymerizing ethylene and a vinyl ester-based monomer and then saponifying this, and is a water insoluble thermoplastic resin.

Normally, with a view to economy, vinyl acetate is generally used as the vinyl ester-based monomer. The polymerization method may be any known polymerization method, such as solution polymerization, suspension polymerization, emulsion polymerization, or bulk polymerization, but solution polymerization using methanol as a solvent is generally used. Furthermore, this may be either of the continuous type or the batch type.

Ordinary pressurized ethylene polymerization may be performed as the method for introducing ethylene into the copolymer. The content of ethylene units can be controlled by way of the pressure of ethylene, and is usually selected in the range of 25 to 80 kg/cm$^2$ depending on the target ethylene content.

Saponification of the resulting ethylene-vinyl ester-based copolymer can also be performed by known methods. The saponification can be performed using an alkali catalyst or an acid catalyst, with the copolymer obtained above dissolved in alcohol or hydrous alcohol.

The EVOH resin synthesized as described above primarily contains an ethylene unit and a vinyl alcohol structural unit, and includes some vinyl ester structural units remaining without being saponified.

The EVOH resin used as the material for the EVOH resin pellets may further contain structural units derived from the comonomers indicated below. Examples of the aforementioned comonomers include: α-olefins, such as propylene, isobutene, α-octene, α-dodecene and α-octadecene; hydroxyl group-containing α-olefins, such as 3-buten-1-ol, 4-penten-1-ol, and 3-buten-1,2-diol, and α-olefin derivatives containing hydroxyl groups, such as esterified products thereof and acylated products thereof; hydroxyalkyl vinylidenes such as 2-methylene propane-1,3-diol, and 3-methylenepentane-1,5-diol; hydroxyalkyl vinylidene diacetates such as 1,3-diacetoxy-2-methylene propane, 1,3-dipropionyloxy-2-methylene propane and 1,3-dibutyryloxy-2-methylene propane; unsaturated carboxylic acids or salts/partial alkyl esters/complete alkyl esters/nitriles/amide/anhydrides thereof; unsaturated sulfonic acids or salts thereof; vinylsilane compounds; vinyl chloride; styrene; and the like.

Further, a "post-modified" EVOH-based resin, which has been urethanized, acetalated, cyanoethylated or oxyalkylenated or the like, may be used as the EVOH resin.

Among modified products such as described above, EVOH resin in which a primary hydroxyl group is introduced into a side chain by copolymerization is preferred from the viewpoint of favorable postformability such as stretching and vacuum/pressure forming; and among these, EVOH resins having a 1,2-diol structure in a side chain are preferred.

The ethylene unit content (ethylene unit content ratio) of the EVOH resin constituting the EVOH resin pellet group used for the molding material is preferably from 20 to 60 mol %. If the ethylene unit content ratio is too low, resulting molded articles, and particularly stretched films, tend to have inferior gas barrier properties at high humidity and inferior appearance, while if this is too high, the gas barrier properties of the stretched film tend to be inferior.

The saponification degree of the vinyl ester component in the EVOH resin constituting the EVOH resin pellet group used for the molding material is preferably 90 mol % or more, particularly preferably 93 to 99.99 mol %, and more preferably 98 to 99.99 mol %. If the saponification degree is too low, the gas barrier properties, moisture resistance and the like of the stretched film tend to be inferior.

The melt flow rate (MFR) (210° C., 2160 g load) of the EVOH resin constituting the EVOH resin pellet group used for the molding material is preferably 1 to 100 g/10 min, particularly preferably 2 to 50 g/10 min, and more preferably 3 to 30 g/10 min. If the MFR is too great, the mechanical strength of the molded article tends to be inferior, and if this is too low, the extrusion workability when molding tend to be inferior.

There are no particular limitations on the copolymerization conditions for synthesizing the EVOH resin as described above, but it is preferable to use the following conditions.

Examples of solvents used for this copolymerization include lower alcohols such as methanol, ethanol, propanol, and butanol; and ketones such as acetone and methyl ethyl ketone, and in terms of industrial applicability, the use of methanol is suitable.

The amount of solvent used may be selected as appropriate in accordance with the degree of polymerization of the copolymer targeted, with consideration for the chain transfer constant of the solvent, and, for example, when the solvent is methanol, S (solvent)/M (monomer) is preferably from 0.01 to 10 (weight ratio), and it is particularly preferable that this is selected in the range of 0.05 to 7 (weight ratio).

Polymerization catalysts used for copolymerization include, for example, known radical polymerization catalysts such as azobisisobutyronitrile, acetyl peroxide, benzoyl peroxide, and lauryl peroxide; peroxyesters such as t-butyl peroxyneodecanoate, t-butyl peroxypivalate, α,α'-bis(neo-decanoylperoxy)diisopropylbenzene, cumyl peroxyneodecanoate, 1,1,3,3-tetramethylbutyl peroxyneodecanoate, 1-cyclohexyl-1-methylethylperoxyneodecanoate, t-hexyl peroxyneodecanoate, and t-hexyl peroxypivalate; peroxydicarbonates such as di-n-propyl peroxydicarbonate, di-iso-propyl peroxydicarbonate, di-sec-butyl peroxydicarbonate, bis(4-t-butylcyclohexyl) peroxydicarbonate, di-2- ethoxyethyl peroxydicarbonate, di(2-ethylhexyl) peroxydicarbonate, dimethoxybutyl peroxydicarbonate, and di(3-methyl-3-methoxybutylperoxy) dicarbonate; diacyl peroxides such as 3,3,5-trimethylhexanoyl peroxide, diisobutyryl peroxide, and lauroyl peroxide; such low temperature active radical polymerization catalysts, and the like.

The amount of the polymerization catalyst used varies depending on the type of the catalyst and cannot be determined unconditionally, but is arbitrarily selected according to the polymerization velocity. For example, if azobisisobutyronitrile or acetyl peroxide is used, this is preferably from 10 to 2000 ppm, and particularly preferably from 50 to 1000 ppm, with respect to the vinyl ester-based monomer.

A hydroxylactone-based compound or a hydroxycarboxylic acid is preferably co-present with the aforementioned catalyst. Coloring of the pellets can thereby be suppressed. There are no particular limitations on the hydroxylactone-based compound, so long as this is a compound having a lactone ring and a hydroxyl group in the molecule, and examples include L-ascorbic acid, erythorbic acid, glucono-delta lactone and the like, and preferably L-ascorbic acid or erythorbic acid is used. Furthermore, examples of the hydroxycarboxylic acid include glycolic acid, lactic acid, glyceric acid, malic acid, tartaric acid, citric acid, and salicylic acid, and preferably citric acid is used.

For both the batch and continuous types, the amount of the hydroxylactone-based compound or the hydroxycarboxylic acid used with respect to 100 parts by weight of the vinyl ester-based monomer is preferably 0.0001 to 0.1 parts by weight, particularly preferably 0.0005 to 0.05 parts by weight, and more preferably 0.001 to 0.03 parts by weight. If the amount is too small, the effect of this being co-present tends to be insufficient, while if this is too great, it tends to impede the polymerization of the vinyl ester-based monomer. There are no particular limitations on the manner in which these compounds are charged into the polymerization system, but they are usually charged into the polymerization reaction system diluted in a solvent such as a lower aliphatic alcohol (methanol, ethanol, propanol, tert-butanol or the like), an aliphatic ester including a vinyl ester-based monomer (methyl acetate, ethyl acetate or the like), and water, or a mixture of these solvents.

Although differences in the solvent used and the pressure make generalizations difficult, the copolymerization reaction is usually carried out at no greater than the boiling point of the solvent, preferably at 40 to 80° C., and particularly preferably at 55 to 80° C. If the temperature is too low, polymerization will require a long period of time, and a large amount of catalyst will be required if one attempts to reduce the polymerization time; conversely, if this is too high, control of the polymerization will be difficult, which is undesirable.

The polymerization time is preferably 4 to 10 hours (particularly 6 to 9 hours) in the case of the batch type. If the polymerization time is too short, the polymerization temperature will have to be increased or a large amount of catalyst will have to be provided; conversely, if the polymerization time is too long, this is undesirable in view of productivity. In the case of the continuous type, the average residence time in the polymerization tank is preferably 2 to 8 hours (particularly 2 to 6 hours); if the residence time is too short, the polymerization temperature will have to be increased or a large amount of catalyst will have to be provided; conversely, if the polymerization time is too long, this is undesirable in view of productivity.

In view of productivity, the polymerization rate (of the vinyl ester-based monomer) is established as high as possible, within the range where control of the polymerization is possible, and is preferably 20 to 90%. If the polymerization rate is too low, there will be problems in terms of productivity, the presence of large amount of unpolymerized vinyl acetate monomer, and the like; conversely, if this is too high, control of the polymerization will be difficult, which is undesirable.

After polymerization for a predetermined period of time, and after reaching a predetermined polymerization rate, a polymerization inhibitor is added as necessary, unreacted ethylene gas is evaporated off, and then the unreacted vinyl ester is expelled.

An example of methods for removing unreacted vinyl ester from the ethylene-vinyl ester copolymer from which ethylene has been evaporated off includes a method in which, while continuously supplying the copolymer solution at a constant rate from the upper part of a column packed with Raschig rings, and blowing an organic solvent vapor such as methanol from the lower part of the column, a mixed vapor of the organic solvent such as methanol and the unreacted vinyl ester is distilled out from the top of the column, and the copolymer solution from which unreacted vinyl ester that has been removed is taken out from the bottom of the column.

An alkali catalyst is added to the copolymer solution from which unreacted vinyl ester has been removed to saponify the vinyl ester component in the copolymer.

The saponification is performed using an alkali catalyst or an acid catalyst with the copolymer obtained as described above dissolved in alcohol or in a hydrous alcohol. Examples of the alcohol include methanol, ethanol, propanol, and tert-butanol, and methanol is particularly preferably employed. The concentration of the copolymer in the alcohol is selected as appropriate depending on the viscosity of the system, and is usually selected in the range of 10 to 60 wt. %. Examples of the catalyst used for saponification include: alkali catalysts such as hydroxides and alcoholates of alkali metals such as sodium hydroxide, potassium hydroxide, sodium methylate, sodium ethylate, potassium methylate, and lithium methylate; and acid catalysts such as sulfuric acid, hydrochloric acid, nitric acid, metasulfonic acid, zeolite, and cation exchange resins.

The amount of saponification catalyst used is selected as appropriate depending on the saponification method, the targeted degree of saponification and the like, and if an alkali catalyst is used, normally 0.001 to 0.1 equivalents, is preferred and 0.005 to 0.05 equivalents is particularly preferred, with respect to the total amount of monomers such as vinyl ester-based monomers. The saponification method can be any of batch saponification, continuous saponification on a belt, or column-type continuous saponification, depending on the targeted saponification degree and the like, but column-type saponification under constant pressure is preferably used for reasons such as allowing for a reduced amount of alkali catalyst during saponification and the saponification reaction readily progressing with high efficiency.

Although the pressure during saponification cannot be unconditionally stated depending on the targeted ethylene unit content ratio of the EVOH resin, it is selected in the range of 2 to 7 kg/cm$^2$; furthermore, the saponification temperature is preferably 80 to 150° C., and particularly preferably 100 to 130° C.; and the saponification time is selected from 0.5 to 3 hours. Note that after the reaction, the EVOH resin is preferably neutralized as necessary.

The EVOH resin serving as the raw material for the pellets includes, within a range that does not detract from the effects of the present invention, an EVOH resin composition wherein compounding agents commonly compounded with EVOH resins, such as heat stabilizers, antioxidants, antistatic agents, colorants, ultraviolet absorbers, plasticizers, light stabilizers, surfactants, antibacterial agents, desiccants, antiblocking agents, flame retardants, crosslinking agents, curing agents, foaming agents, nucleating agents, anti-fogging agents, biodegradation additives, silane coupling agents, and oxygen absorbers have been added to, and compounded with the EVOH resin synthesized as described above.

(2) Pellet Production

A vast majority of pellets taken from the pellet group of EVOH resin pellets constituting the molding material of the present invention have a surface that is substantially a single closed surface. In other words, the pellet is: 1) a pellet wherein the entire surface consists of a curved surface; 2) a pellet having no corners formed by the intersection of multiple faces; and 3) a pellet wherein the cross section at any position on the pellet is not rectangular. Preferably, it is a pellet having an oval cross section perpendicular to the long diameter of the pellet. Such pellets are usually obtained by melt extrusion and cutting the EVOH resin in the molten state.

If the EVOH resin is melt-extruded and cut with a cutter before cooling and hardening, the edge portion produced by cutting runs while cooling and hardening, and the surface tension acts so as to produce a sphere resulting a pellet wherein the entire surface consists of a single closed surface. Specifically, depending on the shape at the time of melt extrusion (usually a quadrangular prism or cylinder), a pellet can be obtained having a shape such as a sphere including an ellipsoid, a disk shape, a rugby-ball shape, and a chestnut shape, occasionally, a teardrop shaped or true spherical pellet can be obtained.

The present invention is characterized by using, as a molding material, a group of pellets having shapes closer to true spheres and having less variation in shape than conventionally known pellets having a sphere including an ellipsoid, a disk shape, a rugby-ball shape, or a chestnut shape.

An example of methods for obtaining a pellet group used for the molding material of the present invention includes the following methods:

1. a method of obtaining the aforementioned pellet group by sieving conventionally known pellets having a shape such as a sphere including an ellipsoid, a disk shape, a rugby-ball shape, or a chestnut shape, so as to sort for pellets with a desired long diameter/short diameter ratio;
2. a method of lowering the circumferential speed of the cutter blades when cutting the EVOH resin in the molten state;
3. a method of lowering the rotational speed of the cutter blades when cutting the EVOH resin in the molten state;
4. a method of lowering the discharge linear velocity of resin when cutting the EVOH resin in the molten state; and
5. a method of sufficiently solidifying the very soft pellets immediately after cutting the EVOH resin in the molten state by immersing these in a poor solvent or a low temperature solvent.

None of these methods have conventionally been adopted because they lower production efficiency, but in the present invention, by adopting these methods, it became possible to obtain a pellet group having the aforementioned characteristics. These can be adopted alone or in combination thereof.

Among these, methods 2, 3, and 4 above, with which the extent to which production efficiency is lowered is small, are preferred. Furthermore, if a combination of methods 2, 3 and 4 above and method 5 above is adopted, the pellet group productivity tends to increase.

A specific manufacturing method for the aforementioned pellets will be described in detail below.

In terms of the EVOH resin raw material that is fed into the melt extruder in order to manufacture the pellets: (i) a solution or slurry of the EVOH resin obtained by saponification in the EVOH synthesis method described above may be used as-is, or a hydrous EVOH resin composition, in which the water content of said solution or slurry has been suitably adjusted, may be used; or (ii) pellets of the EVOH resin obtained by the strand cutting method (dry EVOH resin pellets) may be melted and the EVOH resin in the molten state (dry EVOH resin) may be used.

(2-1) In Case That Hydrous EVOH Resin Composition (Paste) Is Used As Raw Material When a hydrous EVOH resin composition (paste) is used as a raw material for pellets to be fed into an extruder, it is preferable that this be a hydrous EVOH resin composition containing 0 to 10 parts by weight of alcohol and 10 to 500 parts by weight of water with respect to 100 parts by weight of EVOH resin.

If a hydrous EVOH resin composition having a large alcohol content is used, volatilization of alcohol in subsequent processes cannot be prevented, such that it will be difficult to ensure a working environment or surrounding environment. Furthermore, if the temperature of the pellet washing water is raised in order to remove the alcohol, the pellets tend to stick to each other, and conversely, with washing at low temperatures, the washing time is prolonged resulting in decreased production efficiency.

On the other hand, when using a hydrous EVOH resin composition containing large amounts of water, when cut in the molten state, after cutting, the pellets tend to fuse to each other and the pellet shapes tend to be heterogeneous while, conversely, if the water content is low, the flowability of the hydrous EVOH resin composition is insufficient such that the pellet productivity tends to decrease.

Examples of the method for adjusting the water content of the hydrous EVOH resin composition for manufacturing pellets include, but not limited to, a method in which water is sprayed on the resin, a method in which the resin is immersed in water, as well a method in which the resin is brought into contact with water vapor, in order to increase the water content. In order to lower the water content, the composition may be dried conveniently, for example, using a fluid type hot air dryer and/or a static type hot air dryer. With a view to reducing dry spots, the use of a fluid type hot air drier is preferred. Further, with a view to preventing thermal deterioration, a drying temperature of 120° C. or less is preferred.

Although the saponified EVOH resin solution is usually obtained as a solution containing a large amount of alcohol, by bringing the saponified EVOH resin solution into contact with water vapor, a hydrous EVOH composition having a low alcohol content can be withdrawn from the vessel and used as a raw material for producing pellets.

If a hydrous EVOH resin composition is fed into an extruder as the raw material for pellets, the temperature of the hydrous EVOH resin composition in the extruder is preferably 70 to 170° C., particularly preferably 80° C. or more, and more preferably 90° C. to 170° C. If the temperature of the hydrous EVOH resin composition is too low, the EVOH resin may not melt completely, and if the temperature is too high, the EVOH may be more susceptible to thermal degradation. Note that the temperature of the resin composition refers to the temperature detected in the vicinity of the discharge opening at the forward end of the extruder, by a temperature sensor installed in the extruder cylinder.

There are no particular limitations on the extruder used, but with a view to the ease of handling of the pellets, the nozzle opening size (diameter) is preferably 1 to 10 mm, and particularly preferably 2 to 5 mm.

The number of cutter blades is preferably 2 to 8, and particularly preferably 3 to 6.

The cutter blades are preferably mounted so as to be in contact with the discharge opening of the extruder die, and thus the distance between the die and the cutter is 0 mm, but the distance may be approximately 0.01 to 0.2 mm.

The rotational speed of the cutter blades is preferably 50 to 2000 rpm, particularly preferably 100 to 1100 rpm, more preferably 200 to 1000 rpm, and even more preferably 500 to 1000 rpm. If the numerical value is within the aforementioned ranges, the molding material of the present invention tends to be obtained more efficiently.

The circumferential speed of the cutter blades is preferably 1 to 6 m/sec, particularly preferably 1 to 5 m/sec, and more preferably 1 to 3 m/sec. If the numerical value is within the aforementioned ranges, the molding material of the present invention tends to be obtained more efficiently.

Note that the discharge linear velocity of the resin from the die is preferably 10 to 200 m/sec, particularly preferably 50 to 150 m/sec, and more preferably 60 to 100 m/sec. If the numerical value is within the aforementioned ranges, the molding material of the present invention tends to be obtained more efficiently.

Note that the size and shape of the pellets can be adjusted by suitably adjusting the opening size of the nozzle, the number of cutter blades, the rotational speed of the cutter blades and the like.

The hydrous EVOH resin composition extruded from the die, which is to say, the EVOH resin in the molten state, is cut before cooling and hardening (hot cutting method). The hot cutting method may include cutting in the open air (air cutting method); and extruding into a container in which a cutter is installed, which is filled with coolant, and cutting in the coolant (underwater cutting method), but the underwater cutting method is preferred. For example, the underwater cutting method can be performed using an underwater pelleting device.

The coolant is not limited to water. Water/alcohol mixtures, aromatic hydrocarbons such as benzene, ketones such as acetone and methyl ethyl ketone, ethers such as dipropyl ether, and organic esters such as methyl acetate, ethyl acetate, and methyl propionate, and the like may be used. Among these, in consideration of the ease of handling, the use of water or a water/alcohol mixed solution is preferred. The water/alcohol ratio (weight ratio) in the water/alcohol mixed solution is usually 90/10 to 99/1. Note that the alcohols include lower alcohols such as methanol, ethanol, and propanol, and in industry, methanol is preferably used.

The temperature of the coolant in the underwater cutting method is a temperature at which the EVOH resin extruded in the molten state does not instantly harden (solidify), and if the resin comes into contact with the coolant before cutting, the temperature of the coolant is preferably −20 to 50° C., and particularly preferably −5 to 30° C.

(2-2) in Case that Dry EVOH Resin Pellets are Used as Raw Material

When dry EVOH resin pellets (usually having a water content of 0.5 wt. % or less) are used as a raw material for the EVOH resin pellets constituting the molding material of the present invention, the dry EVOH resin pellets are fed into an extrusion kneader, and melt extruded.

There are no particular limitations on the size and shape of the dry EVOH resin pellets used as a raw material.

The temperature of the EVOH resin in the extrusion kneader must be set higher than in the case of a hydrous EVOH resin composition. Specifically, this is preferably 150 to 300° C., particularly preferably 200 to 285° C., and more preferably 240 to 270° C. If temperature set is too low, there is a tendency for the EVOH resin pellets not to be completely melted. Conversely, if the EVOH resin temperature is too high, the EVOH resin tends to be more susceptible to thermal deterioration. The resin temperature refers to the temperature detected in the vicinity of the discharge opening at the forward end of the extruder by a temperature sensor installed in the extruder cylinder.

There are no particular limitations on the extruder used, but with a view to the ease of handling of the pellets, the nozzle opening size (diameter) is preferably 1 to 5 mm, and particularly preferably 2 to 3.5 mm.

The number of cutter blades is preferably 2 to 8, and particularly preferably 3 to 6.

The cutter blades are preferably mounted so as to be in contact with the discharge opening of the extruder die, and thus the distance between the die and the cutter is 0 mm, but the distance may be approximately 0.01 to 0.2 mm.

The rotational speed of the cutter blades is preferably from 10 to 2000 rpm, particularly preferably from 50 to 1100 rpm, more preferably from 100 to 1000 rpm, even more preferably from 200 to 1000 rpm. If the numerical value is within the aforementioned ranges, the molding material of the present invention tends to be obtained more efficiently.

The circumferential speed of the cutter blades is preferably 1 to 6 m/sec, particularly preferably 1 to 5 m/sec, and more preferably 1 to 3 m/sec. If the numerical value is within the aforementioned ranges, the molding material of the present invention tends to be obtained more efficiently.

Note that the discharge linear velocity of the resin from the die is preferably 10 to 200 m/sec, particularly preferably 50 to 150 m/sec, and more preferably 60 to 100 m/sec. If the numerical value is within the aforementioned ranges, the molding material of the present invention tends to be obtained more efficiently.

Note that the shape of the pellets can be adjusted by suitably adjusting the opening size of the nozzle, the number of cutter blades, the rotational speed of the cutter blades, and the like.

As in the case of using a hydrous EVOH resin composition as a raw material, either the air cutting method or underwater cutting method may be adopted for cutting in the molten state, but the underwater cutting method is preferred. In terms of the coolant for the underwater cutting method, coolants of the types mentioned by way of example in the case when a hydrous EVOH resin composition is used as a raw material can be used. However, when dry EVOH resin pellets are used as a raw material, solidification occurs more readily than when the hydrous EVOH resin composition is used as a raw material, and thus the temperature of the coolant in the underwater cutting method is higher than that when the hydrous EVOH resin composition is used as a raw material, and is preferably 0 to 90° C., and particularly preferably 20 to 70° C.

The pellets obtained as described above are preferably washed with water. In particular, pellets obtained using a hydrous EVOH resin composition as a raw material often contain alkali metal salts, which are residues of the catalyst used during saponification, and thus these pellets are usually washed with water in order to prevent loss of quality, such as coloring of the molded article that is ultimately produced.

Washing with water is performed in a water bath at 10 to 60° C. For example, this is preferably performed in water constituting 200 to 1000 parts by weight (particularly preferably 300 to 600 parts by weight) with respect to 100 parts by weight of the EVOH resin pellet, at a temperature of 20 to 50° C. (particularly preferably 25 to 35° C.) for 0.5 to 5 hours, 1 to 5 times (particularly preferably, 1 time). By way of washing with water in this manner, the content of alcohols having a carbon number of 5 or less, acetic acid, and sodium acetate in the EVOH resin can be adjusted, and oligomers and impurities can also be removed.

Normally, with respect to 100 parts by weight of the EVOH resin pellets, alcohols having a carbon number of 5 or less can be adjusted to 0.0001 to 1 parts by weight, acetic acid can be adjusted to 0.01 to 1 parts by weight, and sodium acetate can be adjusted to 0.01 to 1 parts by weight, by way of washing with water.

If necessary, after washing with water, the EVOH resin pellets are brought into contact with an aqueous solution of additives.

Examples of additives include thermal stabilizers such as organic acids such as acetic acid, propionic acid, butyric acid, lauric acid, stearic acid, oleic acid, and behenic acid, or salts thereof such as salts of alkali metals (sodium, potassium or the like), salts of alkaline earth metals (calcium, magnesium or the like), and salts of zinc; or inorganic acids such as sulfuric acid, sulfurous acid, carbonic acid, phosphoric acid, and boric acid, or salts thereof such as salts of alkali metals (sodium, potassium, or the like), salts of alkaline earth metals (calcium, magnesium or the like), and salts of zinc.

Among these, it is particularly preferred to add acetic acid, boric acid and boron compounds including salts thereof, acetic acid salts and phosphoric acid salts.

By bringing the EVOH resin pellets into contact with an aqueous solution of such additives, the additives can be included in the EVOH resin pellets, and various physical properties such as thermal stability during melt molding can be improved.

In a method for making contact with the aqueous solution of additives, an aqueous solution of additives at 3% or less (particularly preferably 0.3 to 1.5%) is brought into contact with 200 to 1000 parts by weight (particularly preferably 300 to 600 parts by weight) with respect to 100 parts by weight of EVOH resin pellets at a temperature of 10 to 80° C. (particularly preferably 20 to 60° C., and more preferably 30 to 40° C.) for 0.5 to 5 hours, 1 to 3 times (particularly preferably 1 time).

As a result of the operation of bringing about contact with the aqueous solution of additives, normally, with respect to 100 parts by weight of EVOH resin pellets, the acetic acid is preferably adjusted to 0.001 to 1 parts by weight, the boron compounds are adjusted to 0.001 to 1 parts by weight as calculated for the boron (as analyzed by ICP emission spectrometry, after ashing), and the acetate salts and phosphate salts (including hydrogen phosphate) are adjusted to 0.0005 to 0.1 parts by weight as calculated for the metals (as analyzed by ICP emission spectrometry, after ashing).

Subsequent to the processes described above, with a view to production efficiency, a centrifugal separator is normally used as the method for solid-liquid separation of the pellets and the water or the aqueous solution of additives.

The hydrous EVOH resin pellets, in which the concentrations of the components have been adjusted as described above, are dried. The water content of the EVOH resin pellets after drying is preferably 1 wt. % or less, and particularly preferably 0.5 wt. % or less.

Various drying methods can be adopted for this drying method, and examples thereof include a method using a centrifugal dehydrator, a method of draining water during air transport, a stationary drying method, and a fluid drying methods, and multistage drying processes in which several drying methods are combined can also be adopted.

Notably, in the present invention, by way of sufficiently solidifying the pellets by immersing very soft pellets in a poor solvent or a low temperature solvent immediately after cutting, the molding material of the present invention tends to be obtained more efficiently. Examples of such poor solvents include propanol, glycerol, ethyl ether, acetone, methyl ethyl ketone, ethyl acetate, pentane, carbon tetrachloride, ethane dichloride, isobutyl aldehyde, benzene, toluene, aniline, and silicone oil; and low temperature solvents include water, lower alcohols, and hydrous alcohols. The temperature of the low temperature solvent is usually 0 to 10° C.

Within a range that does not detract from the effects of the present invention, compounding agents that are commonly compounded with EVOH resins such as antioxidants, antistatic agents, colorants, ultraviolet absorbers, lubricants, plasticizers, light stabilizers, surfactants, antibacterial agents, desiccants, antiblocking agents, flame retardants, crosslinking agents, curing agents, foaming agents, nucleating agents, anti-fogging agents, biodegradation additives, silane coupling agents, and oxygen absorbers may be compounded in the EVOH resin pellets obtained in this manner as appropriate.

Applications For Molding Material

The molding material of the present invention, constituted as described above, has excellent feed characteristics, and thus is preferably used as a melt molding material for manufacturing EVOH resin molded articles.

The molding material of the present invention can suitably be used for melt molding, particularly as a material for melt extrusion molding of films, sheets, fibers and the like. The melt molding method primarily employed includes extrusion molding methods (such as T-die extrusion, inflation extrusion, blow molding, melt spinning, and profile extrusion) and injection molding methods.

There are no particular limitations on the conditions and the type for the molding machine used, but extruders are usually used. The extruder may employ either a screw type or a plunger type melt plasticizing section, but the screw type is preferable. The extruder may be either of the vertical type or the horizontal type, and may be either of the single screw type or the twin screw type. Furthermore, there are no particular limitations on the L/D ratio (screw length/screw diameter) and compression ratio (C) of the screw, but with a view to more effectively obtaining the effect of the present invention, the L/D ratio is preferably selected in the range of 20 to 35 and particularly preferably 25 to 30, and C is preferably selected in the range of 1.5 to 8, and particularly preferably from 2 to 5.

Note that, when the molding material of the present invention is used, the feed characteristics are improved even, for example, when the rotational speed of the extruder screw is low such that friction is likely to occur between the screw and the molding material. Accordingly, the rotational speed of the extruder screw is preferably 10 to 100 rpm, particularly preferably 20 to 90 rpm, and more preferably 30 to 60 rpm.

The melt-molding temperature is selected in the range of 150 to 300° C.

Although films and sheets produced by molding, can be used for various applications as-is, these are usually used as laminates by way of laminating with another base material in order to further increase strength and impart other functions. On the basis of excellent gas barrier properties thereof, the EVOH resin films, sheets, or laminates thereof, obtained using the molding material of the present invention are used as packaging materials such as food packaging materials, industrial chemical packaging materials, and agricultural chemical packaging materials. Furthermore, the EVOH resin films, sheets, or laminates thereof, may also be secondarily formed into cups, bottles or the like.

Thermoplastic resins are useful for other base materials to be used in laminates. Examples of thermoplastic resins include: polyethylenes such as linear low density polyethylene, low density polyethylene, very low density polyethylene, medium density polyethylene, and high density polyethylene; polyolefins such as polypropylene, ethylene-propylene (block and random) copolymers, propylene-α-olefin ($C_4$ to $C_{20}$ α-olefins) copolymers, polybutene, and polypentene; graft polyolefins wherein these polyolefins have been graft-modified with an unsaturated carboxylic acid or an ester thereof ionomers; ethylene-vinyl acetate copolymers; ethylene-acrylic acid copolymers; ethylene-acrylic acid ester copolymers; polyester resins, polyamide resins (including copolymerized polyamides); polyvinyl chloride; polyvinylidene chloride; acrylic resins; polystyrene; vinyl ester resins; polyester elastomers; polyurethane elastomers; halogenated polyolefins such as chlorinated polyethylene and chlorinated polypropylene; aromatic or aliphatic polyketones; and polyalcohols obtained by reducing these and the like, but in terms of practical utility such as physical properties (particularly strength) of the laminate, polyolefin resins and polyamide resins are preferred, and use of polyethylene and polypropylene is particularly preferred.

Within a range that does not detract from the gist of the present invention, the base material resin may contain antioxidants, antistatic agents, lubricants, nucleating agents, antiblocking agents, ultraviolet absorbers, waxes and the like, such as are conventionally known.

When laminating the resin composition of the present invention with another base material, the lamination method can be performed by way of a known method. Examples of the method include methods in which another base material is melt-extrusion laminated onto a film, a sheet or the like of the resin composition of the present invention, or conversely methods in which said resin is melt-extrusion laminated onto another base material, methods in which said resin and another base material are coextruded, methods in which said resin (layer) and another base material (layer) are dry-laminated with a known adhesive such as an organic titanium compound, an isocyanate compound, a polyester-based compound, or a polyurethane compound, and methods in which a solution of said resin is coated onto another base material and then the solvent is removed.

Among these, in consideration of cost and environmental aspects, methods in which coextruding is performed are preferred. When the molding material of the present invention is used, this can also be used in extrusion molding with another thermoplastic resin. The molding material of the present invention has excellent in film forming characteristics, which is to say, variations and the like in the width of the melt-extruded film are limited, and thus this can suitably be used in the manufacture of multilayer structures applied in melt-coextrusion with another thermoplastic resin.

If the EVOH resin layer derived from the molding material of the present invention is A (A1, A2, . . . ), and the thermoplastic resin layer is B (B1, B2, . . . ), the layer configuration of the laminate can not only be an A/B two-layer structure, but any combination, such as B/A/B, A/B/A, A1/A2/B, A/B1/B2, B2/B1/A/B1/B2, and B2/B1/A/B1/A/B1/B2. Furthermore, if a recycled layer containing a mixture of said EVOH resin and the thermoplastic resin, which has been obtained by remelting and molding end portions or defective portions produced in the process of manufacturing the laminate, is R, the layer configuration may be B/R/A, B/R/A/B, B/R/A/R/B, B/A/R/A/B, B/R/A/R/A/R/B, and the like.

In order to further improve the physical properties, it is preferable that the laminate as described above is subjected to heat stretching treatment. A known stretching method can be adopted for the heat stretching treatment and the like.

The stretching method includes methods having high stretching ratios from among methods such as deep draw forming and vacuum forming as well as roll stretching methods, tenter stretching methods, tubular stretching methods, stretch blowing methods, and the like. In a case of biaxial stretching, either simultaneous biaxial stretching methods or sequential biaxial stretching methods can be adopted. The stretching temperature is preferably selected in the range of 80 to 170° C., and particularly preferably approximately 100 to 160° C.

After stretching treatment, heat setting is preferably performed. The heat setting can be performed by well-known means, with heat treatment performed on the stretched film at 80 to 170° C. (particularly preferably 100 to 160° C.) for approximately 2 to 600 seconds while maintaining a tensioned state.

If the laminated film is used for heat-shrink packaging of raw meat, processed meat, cheese or the like, a film product wherein heat setting is not performed after stretching is used, the raw meat, processed meat, cheese or the like is received in the film, and heat treatment is performed at 50 to 130° C. (particularly preferably 70 to 120° C.) for approximately 2 to 300 seconds to heat-shrink the film and produce tight packaging.

The shape of the laminate includes, but not limited to, films, sheets, tapes, bottles, pipes, filaments, and profile-cross section extruded articles. If necessary, the laminate may be subjected to heat treatment, cooling treatment, rolling treatment, printing treatment, dry lamination treatment, solution or melt coating treatment, bag making processes, deep drawing processes, box processes, tube processes, splitting processes and the like.

EXAMPLES

Hereafter, the present invention will be described in greater detail based on examples, but the present invention is not limited to these examples alone.

EVOH Resin Pellet Production (1) Exemplary EVOH Resin Pellet Group

A water/methanol mixed solution of an EVOH resin having an ethylene content of 29 mol % and a saponification degree of 99.7 mol % (water/methanol=40/60 (weight ratio), EVOH resin concentration 45%) was used as the raw material. The hydrous EVOH was fed into an extruder and melt-kneaded, the melt was extruded from a die having three holes (hole size 2.5 mm) and cut with a hot cutter having three blades. The resin temperature at this time was 60° C. The circulating water in the cutter had a flow rate of 42 l/min. The discharge linear velocity from the die at this time was 32.9 m/min, the rotational speed of the cutter blade was 900 rpm, and the circumferential speed was 2.0 m/sec.

The pellets obtained were dried in a fluidized drier at 122° C. for 16 hours, to obtain an exemplary group of EVOH resin pellets. The water content of the pellets constituting this pellet group was 0.22 wt. %. From the resulting pellet group, 20 pellets were taken in a random manner, the long diameter and the short diameter of the 20 pellets were measured by the measurement methods described above, and the average values thereof were calculated. Furthermore, the long diameter/short diameter ratio was determined for the 20 pellets, and the average value and the standard deviation were calculated. Specifically, in the exemplary EVOH resin pellet group, the average long diameter value was 3.9 mm, the average short diameter value was 3.0 mm, the average long diameter/short diameter ratio value was 1.29, and the standard deviation of the long diameter/short diameter ratio was 0.11.

Figures 2A, 2B:
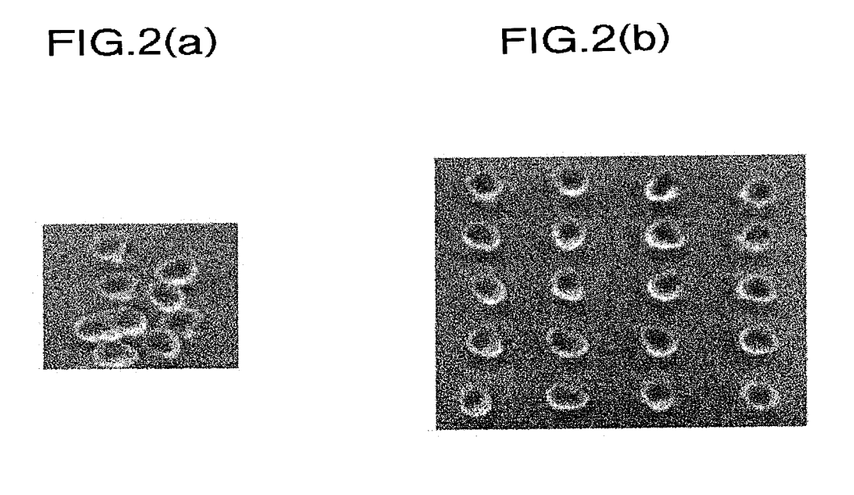

FIG. 2 (a) is a top view of the exemplary EVOH resin pellets, and FIG. 2 (b) is a top view of 20 EVOH resin pellets whose long diameter and short diameter were measured.

(2) Comparative Example EVOH Resin Pellet Group

A water/methanol mixed solution of an EVOH resin having an ethylene content of 29 mol % and a saponification degree of 99.7 mol % (water/methanol=40/60 (weight ratio), EVOH resin concentration 45%) was used as the raw material. The hydrous EVOH was fed into an extruder and melt-kneaded, the melt was extruded from a die having three holes (hole size 2.5 mm) and cut with a hot cutter having five blades. The resin temperature at this time was 60° C. The circulating water in the cutter had a flow rate of 42 l/min. The discharge linear velocity from the die at this time was 56.9 m/min, the rotational speed of the cutter blade was 1800 rpm, and the circumferential speed was 4.1 m/sec.

The pellets obtained were dried in a fluidized drier at 122° C. for 16 hours to obtain a comparative example group of EVOH resin pellets. The water content of the pellets constituting this pellet group was 0.14 wt. %. From the resulting pellet group, 20 pellets were taken in a random manner, the long diameter and the short diameter of the 20 pellets were measured by the measurement methods described above, and the average values thereof were calculated. Furthermore, the long diameter/short diameter ratio was determined for the 20 pellets, and the average value and the standard deviation were calculated. Specifically, with the comparative example EVOH resin pellet group, the average long diameter value was 4.6 mm, the average short diameter value was 2.8 mm, the average long diameter/short diameter ratio value was 1.67, and the standard deviation of long diameter/short diameter was 0.15.

Figure 3A:
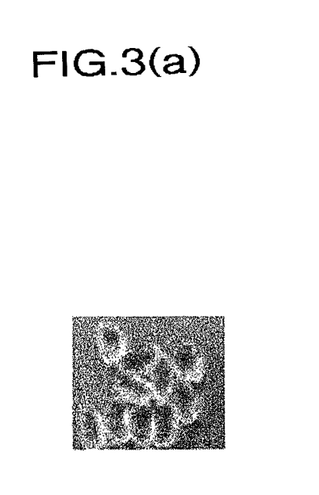
Figure 3B:
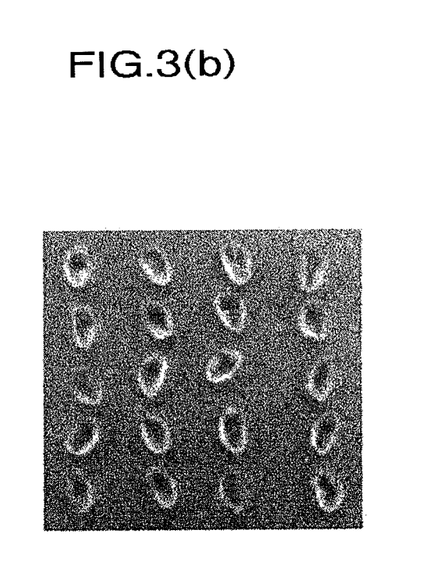

FIG. 3 (a) is a top view of the comparative example EVOH resin pellets, and FIG. 3 (b) is a top view of 20 of EVOH resin pellets whose long diameters and short diameters were measured.

Evaluation Method

The molding material was fed into an extruder and film forming was performed under the following conditions to form an EVOH resin film having a thickness of 50 μm.

Inner screw diameter: 40 mm

L/D: 28

Screw compression ratio: 3.0

T-die: coat hanger type

Die width: 450 mm

Rotational speed of extruder screw: 40 rpm or 80 rpm

Extrusion temperature (° C.): C1/C2/C3/C4/H (head)/AD (adapter)/D (die)=180/190/220/220/220/220/220

Feed Characteristics

An auscultation rod was applied to the lower part of the extruder hopper and the number of times that abnormal noise from the extruder occurred was counted for 20 seconds. The counting was performed 10 times with 10 seconds between each count, and the average value of the number of occurrences of abnormal noise was calculated. More numerous occurrences of such abnormal noise mean that greater loads are applied to the screw of the extruder.

Discharge Amount

After 20 minutes, 40 minutes, and 60 minutes from the start of film formation, the weight of the EVOH resin film collected over periods of 2 minutes was measured. Among the three measurement results, the maximum value is defined as Dmax and the minimum value is defined as Dmin. The greater the difference between Dmax and Dmin, and the larger the ratio of Dmax and Dmin, the more unstable the discharge is, meaning that stable extrusion molding cannot be achieved.

Feed Characteristics

TABLE 1

|  | Average value of long diameter/short diameter ratio | Standard deviation of long diameter/short diameter ratio | Average number of occurrences of abnormal noise (per 20 seconds) Rotational speed of extruder screw | |
| --- | --- | --- | --- | --- |
|  |  |  | 40 rpm | 80 rpm |
| Example | 1.29 | 0.11 | 0 | 1 |
| Comparative example | 1.67 | 0.15 | 2 | 3 |

When the rotational speed of the screw was 40 rpm, in the comparative example, two abnormal noises occurred, while abnormal noises did not occur in the example. Further, when the rotation speed of the screw was 80 rpm, three abnormal noises occurred in the comparative example, while there was only one occurrence in the example. As described above, in the example, the number of occurrences of abnormal noise decreased, and thus it was understood that the load applied to the screw of the extruder was decreased.

Difference in Discharge Amount: Dmax–Dmin

TABLE 2

|  | Average value of long diameter/short diameter ratio | Standard deviation of long diameter/short diameter ratio | Dmax – Dmin (g/2 minutes) rotational speed of extruder screw 40 rpm |
| --- | --- | --- | --- |
| Example | 1.29 | 0.11 | 1.3 |
| Comparative example | 1.67 | 0.15 | 2.2 |

Discharge Amount Ratio: Dmax/Dmin

TABLE 3

|  | Average value of long diameter/short diameter ratio | Standard deviation of long diameter/short diameter ratio | Dmax/Dmin rotational speed of extruder screw 40 rpm |
|---|---|---|---|
| Example | 1.29 | 0.11 | 1.005 |
| Comparative example | 1.67 | 0.15 | 1.008 |

The discharge amount difference and the discharge amount ratio are lower in the example than in the comparative example, and thus it is understood that, in the example, the discharge of the molten resin is stable, and stable extrusion molding takes place.

INDUSTRIAL APPLICABILITY

The molding material of the present invention has excellent feed characteristics when used in melt molding, and thus serves to improve working environments in production sites and to reduce the load on the melt extruder, such that it can advantageously be used in production sites.

REFERENCE SIGNS LIST a long diameter (maximum outer diameter of pellet)
b maximum cross section diameter
c short diameter (minimum cross section diameter)
F cross section
P pellet

The invention claimed is:

1. A method of molding a molded article comprising:
    feeding a molding material comprising a pellet group of at least 20 saponified ethylene-vinyl ester-based copolymer pellets an extruder wherein,
    the rotational speed of a screw in the extruder is 10 to 100 rpm,
    at least 95% of the pellets have a surface that is substantially a single closed surface; and
    when a maximum outer diameter of a pellet is taken as a long diameter and a minimum diameter in a cross section having the greatest area among cross sections perpendicular to the long diameter is taken as a short diameter, the average value of the long diameter/short diameter ratio of at least 20 pellets taken from the pellet group is 1.6 or less and the standard deviation of the long diameter/short diameter ratio of the at least 20 pellets is 0.13 or less, and
    the at least 95% of the pellets have an oval cross section perpendicular to the long diameter.

* * * * *